(No Model.)
M. L. SENDERLING.
DUMP WAGON.
No. 488,292. Patented Dec. 20, 1892.
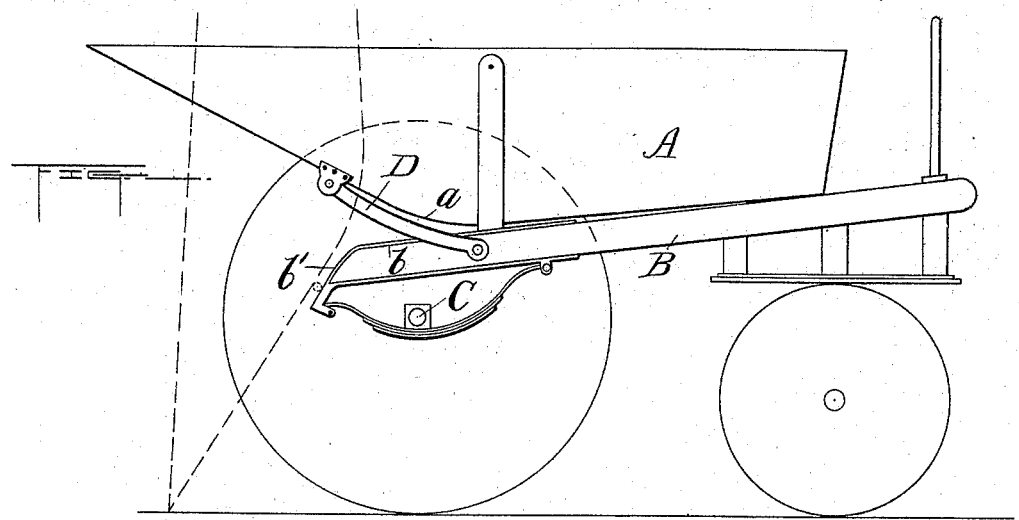
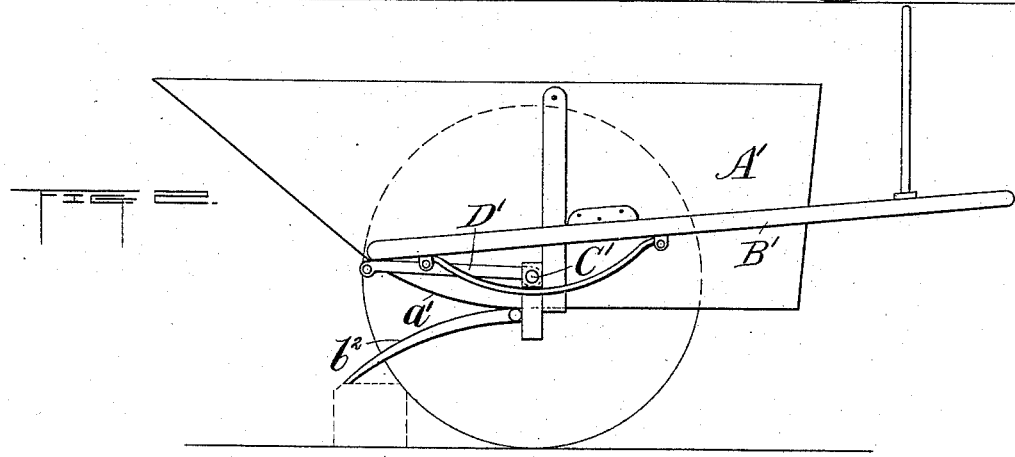
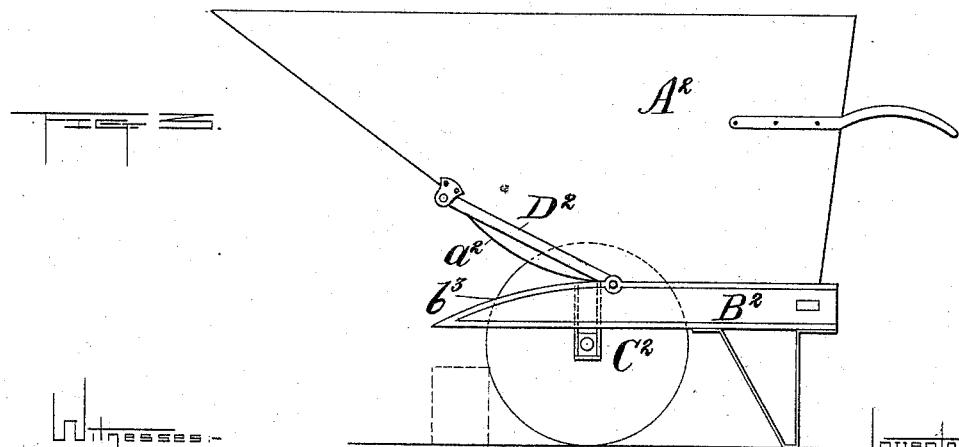
Witnesses:
R. S. Seward
George Barry.
Inventor
Martin L. Senderling
by his attorneys
Brown & Seward

UNITED STATES PATENT OFFICE.

MARTIN L. SENDERLING, OF JERSEY CITY, NEW JERSEY.

DUMP-WAGON.

SPECIFICATION forming part of Letters Patent No. 488,292, dated December 20, 1892.

Application filed December 31, 1891. Serial No. 416,674. (No model.)

*To all whom it may concern:*

Be it known that I, MARTIN L. SENDERLING, of Jersey City, in the county of Hudson and State of New Jersey, have invented a new and useful Improvement in Dump-Wagons, of which the following is a specification.

My invention relates to an improvement in dumping wagons or vehicles in which the body during its tilting movement to dump the load is caused to travel bodily to the rear.

A practical embodiment of my invention is represented in the accompanying drawings in which, Figure 1 is a view of the wagon in which the body is supported at a point above the centers of the wheels. Fig. 2 is a view of the cart in which the body is supported at a point below the centers of the wheels, and Fig. 3 is a view of the hand barrow or cart.

The several views are taken in side elevation the wheel toward the observer being removed and those parts which are not intimately connected with my present invention being indicated in outline.

The body of the vehicle is represented in Fig. 1 by A, in Fig. 2 by A' and in Fig. 3 by $A^2$. In each instance the rearward portion of the bottom of the body is provided with a smooth curved bearing represented in Fig. 1 by $a$, in Fig. 2 by $a'$ and in Fig. 3 by $a^2$. I have shown the curved bearings $a$, $a'$ and $a^2$ as formed on the bottom of the body but it is obvious that they might be formed by special bearing pieces secured to the side of the body if so desired. The frames upon which the bodies are supported are represented in Fig. 1 by B, in Fig. 2 by B' and in Fig. 3 by $B^2$ and said frames are formed at their rear portions with smooth bearing surfaces to receive the curved bearings $a$, $a'$ and $a^2$ upon the bodies. In Fig. 1 the bearing surface on the frame B extends for a certain distance straight, as shown at $b$, and then terminates in a steep downward incline $b'$. In Fig. 2 the bearing surface is represented by $b^3$ and consists of a frame having a pair of curved side rails $b^2$ the said frame being suspended from the body supporting frame B' and adapted to rest with its rear end upon the dock log or other suitable support over which the load is intended to be dumped. In Fig. 3 the bearing surface is represented by $b^3$ and is curved to correspond with the curved bearing $a^2$ on the body.

The body supporting frames B, B' and $B^2$ rest upon springs secured to the axles, as shown in Figs. 1 and 2 or upon the axle itself, as shown in Fig. 3.

The axles C and $C^2$ represented in Figs. 1 and 3 are straight while the axle C' represented in Fig. 2 is cranked and the body is allowed to depend within the cranked portion.

Links D, D' and $D^2$ secured at their rear ends to the body and at their forward ends to the supporting frames or axles serve to hold the body against sliding off the bearing surfaces as the body is tilted, connections (not shown) of any well known or suitable form being made between the forward ends of the body and the supporting frame to prevent the body from tilting over too far.

In operation the bodies with their load rest upon the supporting frames at points forward of the curved bearings $a$, $a'$ and $a^2$ but as soon as the body begins to tilt the fulcrum begins to change toward the rear and follows along the curved bearings until the body has reached its tilted adjustment. This feature causes the load to be carried bodily to the rear as the body is being tilted to dump and keeps it at all times under the control of the operator as the shifting of the fulcrum to the rear during the tilting movement keeps the load substantially balanced upon the fulcrum until it begins to discharge. It also provides for tilting the body of the vehicle far enough over to insure the discharge of any load no matter how strong its tendency to adhere to the body.

I have shown the bearing on the body curved and the bearing surface on the supporting frame either straight or curved. It is obvious that the bearing upon the supporting frame might be curved and the bearing surface upon the body straight, the same being a reversal of the parts as represented in Fig. 1.

What I claim is:

1. The combination with the body of the vehicle having a curved bearing fixed thereto, and a support on which the body rests, of a link pivotally secured at one end to the body and at the other end to the support for retaining the body in position with its curved bearing on the support, the body being free to change the position of its fulcrum on the support during its tilting movement, substantially as set forth.

2. In combination, the body of the vehicle having a curved bearing thereon, and the supporting frame having a smooth curved bearing surface in position to engage the smooth curved bearing on the body, the body being free to move bodily as the bearing moves along its support and a link pivotally secured at one end to the body and at the other end to the supporting frame for retaining the body in position on the bearing, substantially as set forth.

MARTIN L. SENDERLING.

Witnesses:
FREDK. HAYNES,
I. B. DECKER.